United States Patent [19]

Kalversberg

[11] 3,924,491
[45] Dec. 9, 1975

[54] HYDRODYNAMIC-MECHANICAL TRANSMISSION FOR AUTOMOBILES

[75] Inventor: Manfred Kalversberg, Wolfsburg, Germany

[73] Assignee: Volkswagenwerk Aktiengesellschaft, Wolfsburg, Germany

[22] Filed: Apr. 24, 1974

[21] Appl. No.: 463,821

[30] Foreign Application Priority Data
May 30, 1972 Germany............................ 2327471

[52] U.S. Cl. ........................ 74/763; 74/753; 74/762
[51] Int. Cl.² ...................... F16H 57/10; F16H 3/44
[58] Field of Search ............. 74/763, 762, 753, 758, 74/759

[56] References Cited
UNITED STATES PATENTS

| | | | |
|---|---|---|---|
| 2,755,688 | 7/1956 | Swennes | 74/762 X |
| 3,354,752 | 11/1967 | General et al. | 74/763 |
| 3,525,275 | 8/1970 | Lemieux | 74/763 X |
| 3,614,902 | 10/1971 | Candellero | 74/730 X |
| 3,661,035 | 5/1972 | Liang | 74/763 |
| 3,690,196 | 9/1972 | Bilton | 74/730 |
| 3,776,066 | 12/1973 | Piret | 74/763 |
| 3,780,601 | 12/1973 | Dach et al. | 74/762 |
| 3,799,004 | 3/1974 | Hause | 74/763 |

*Primary Examiner*—Samuel Scott
*Assistant Examiner*—P. S. Lall
*Attorney, Agent, or Firm*—Brumbaugh, Graves, Donohue & Raymond

[57] ABSTRACT

A hydrodynamic-mechanical transmission for automobiles comprises a torque converter, a planetary gear train and connecting devices associated with the gear elements. The planetary gear train includes two simple planetary sets connected by means of a common sun gear. The connecting devices include (1) a forward clutch connecting the turbine shaft of the torque converter with the ring gear of the first planetary set, (2) a direct and reverse clutch coupling the turbine shaft with a clutch housing, which surrounds the forward clutch and is connected with the sun gear, (3) a band brake acting on the clutch housing, (4) a multiple-disk brake actuated by a cylindrical piston and acting on the planet carrier of the second planetary set and (5) an overriding brake likewise acting on the planet carrier. The first planetary set, the forward clutch, the clutch housing and the cylindrical piston are arranged concentrically with each other.

5 Claims, 3 Drawing Figures

HYDRODYNAMIC-MECHANICAL TRANSMISSION FOR AUTOMOBILES

BACKGROUND OF THE INVENTION

This invention relates to hydrodynamic-mechanical transmissions and, more particularly, to automotive hydromechanical transmissions of relatively small axial length.

In a known transmission of the type which has a torque converter and two planetary gear trains or sets, a multiple disk brake adapted to prevent rotation of the planet carrier of the second gear set is arranged coaxially around the second planetary set. Also, an overriding brake, designed as a grip roller freewheel, controls rotation of the planet carrier of the second set and is assembled axially adjacent to the second planetary gear set. The multiple-disk brake is acted on by pressure from an actuating piston, which is guided in a bell shaped structure over the freewheel of the overriding brake. The pressure is applied from the side of the gear box adjacent the freewheel. Accordingly, this design for an automobile automatic transmission requires a comparatively large overall axial length, which constitutes a disadvantage, especially where the transmission and the engine are to be located together in a transverse direction in the vehicle.

SUMMARY OF THE INVENTION

The present invention is directed to reducing the overall axial length of prior art automatic transmissions by arranging the multiple-disk brake, the clutch housing, and the first planetary gear set concentrically of each other, respectively, and by activating the multiple-disk brake with a cylindrical piston that surrounds the clutch housing and a band brake. While the concentric arrangement of the elements of the transmission cause a minor enlargement of its radial dimensions, there is a decisive shortening of the transmission in the axial direction. The reduction in length is achieved because the multiple-disk brake is arranged in the space radially above the forward clutch and no additional axial constructional space is required, either for the accommodation of the actuating piston of the multiple-disk brake or for the band brake.

In an illustrative embodiment of the invention the transmission has a torque converter coupled to first and second simple planetary gear sets having a common sun gear. The speed range in which the transmission is operating depends on the actuation of (1) a forward clutch coupling the turbine shaft of the torque converter to the ring gear of the first planetary set, (2) a direct and reverse clutch coupling the turbine shaft with a clutch housing that surrounds the forward clutch and is connected to the sun gear, (3) a band brake adapted to prevent rotation of the clutch housing, (4) a multiple-disk brake actuated by a cylindrical actuating piston and acting to halt rotation of the planet carrier of the second planetary set and (5) an overriding brake controlling rotation of the planet carrier of the second planetary set. Pressure is applied to the cylindrical actuating piston from a servo pressure space adjacent that end of a housing for the entire planetary gear train which is adjacent the band brake. The actuating piston is guided in a space between an inner diameter of the gear housing and the outer diameter of an oil pump housing centered on the front wall of the gear housing. Since the piston is provided with oil seals, a ring-shaped servo pressure space is created and servo pressure applied to the space will act on the piston causing it to actuate the multiple-disk brake. In this manner, the outer jacket surface of the oil pump housing is utilized as the radially inner guiding surface for the ring-shaped actuating piston and the gear housing is used as the radially outer guiding surface for the actuating piston. In order for the gear housing to act as a guiding surface, the inner contour of the gear housing may have to be modified within that small region.

It is an additional characteristic of the present invention to equip the skirt of the actuating piston with window-like openings to accommodate the passage of band brake actuation elements.

A further asset of the invention includes the mounting of the overriding brake, which is designed as grip roller freewheel, concentrically over the second planetary set. As a result of the overall arrangement, the structure of the automatic transmission becomes extremely short in the axial direction and it is possible to assemble a driving combination, consisting of a transmission of this kind and an engine, across the longitudinal axis of a vehicle.

BRIEF DESCRIPTION OF THE DRAWINGS

The foregoing and other features of the present invention will be more readily apparent from the following detailed description and drawings in which.

DESCRIPTION OF AN EXEMPLARY EMBODIMENT

Figure 1:
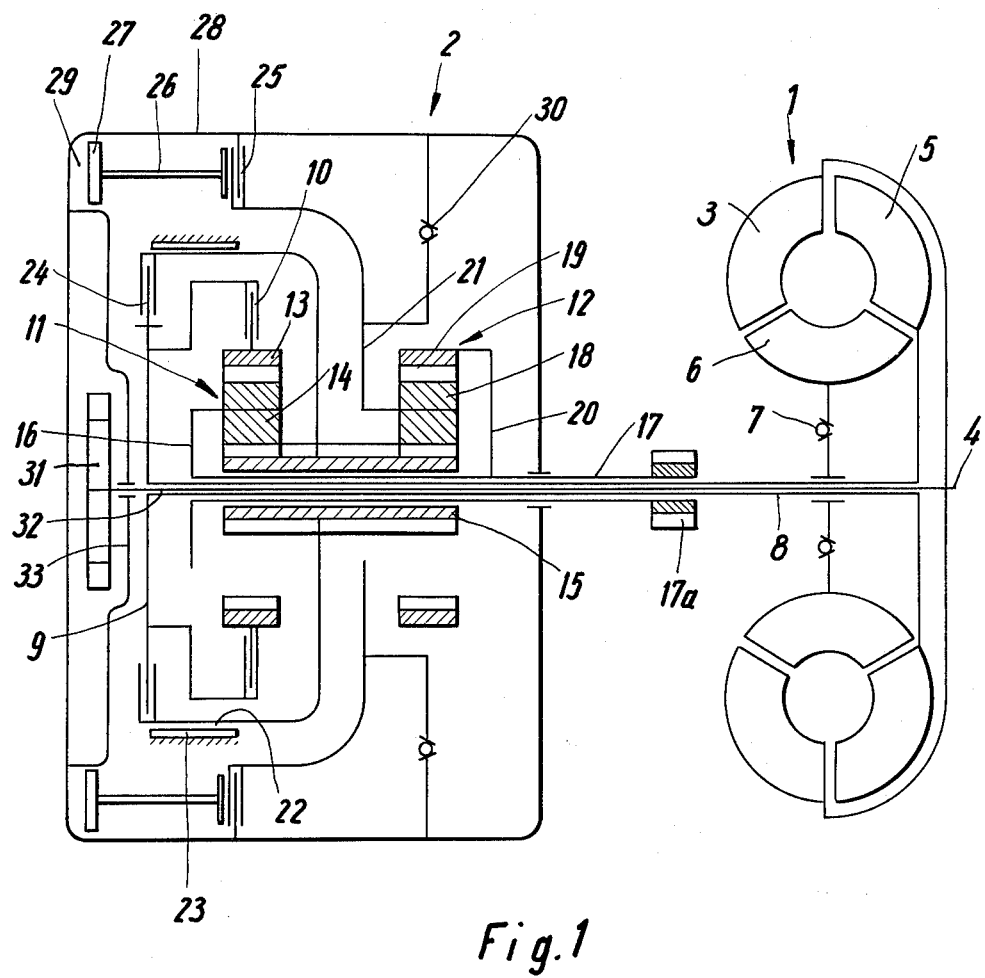
FIG. 1 shows a schematic of the hydrodynamic-mechanical transmission in accordance with the invention.

In FIG. 1 there is shown a hydrodynamic torque converter 1 and a planetary gear system 2, comprising two planetary gear sets, 11 and 12, and associated coupling devices. The torque converter 1 consists essentially of a pump or drive unit 3 driven by the engine shaft 4, a turbine or driven unit 5 and a stator 6 supported by means of a freewheel 7. The turbine 5 is connected over a hollow turbine shaft 8 with a coupling element 9 which constitutes the input for the planetary gear system 2.

A forward clutch 10, designed as multiple-disk clutch, connects the coupling element 9 with a ring gear 13 of the first planetary gear set 11. This first planetary gear set 11 is also equipped with planet gears 14, that are supported on a planet carrier 16 and mesh with the ring gear 13 and a sun gear 15, common to both planetary gear sets 11 and 12. The planet carrier 16 of the first planetary gear set 11 is connected with the output shaft 17 of the transmission on which is fixed a driving pinion 17a for the direct-drive gear of the vehicle (not shown).

The second planetary gear set 12 is constructed in the same manner as the first planetary set 11 and is provided with planet gears 18, which mesh with the sun gear 15, and a ring gear 19 and which are supported on a planet carrier 21. The ring gear 19 of the second planetary set 12 is likewise connected with the driven output shaft 17 over a strap 20 and thus offers a second torque path through the transmission, in addition to the planet carrier 16 of the first planetary set 11.

When actuated, a direct and reverse clutch 24, designed as a multiple disk clutch, connects the coupling element 9 with a clutch housing 22, which surrounds the forward clutch 10 and the first planetary set 11. The clutch housing 22 is connected with the sun gear 15 and can be locked by means of a band brake 23 that surrounds the housing.

The planetary gear system 2 is also provided with a multiple-disk brake 25 which acts on the planet carrier 21 of the second planetary set 12. A tubular actuating piston 26, which concentrically surrounds the clutch housing 22 and the brake band 23, actuates multiple-disk brake 25. The piston 26 has a ring-shaped pressure surface 27 enclosing a servo pressure space 29 at the front end of a housing 28, which encloses the planetary gear system 2.

An overrunning brake 30, designed as a grip roller freewheel, prevents the rotation of the planet carrier 21 of the second planet set 12 in one direction with respect to the gear housing 28. A geared oil pump 31 is driven by a pump shaft 32 which passes through the hollow turbine shaft 8 and is connected with the pump 3 of the torque converter 1. The pump 31 is surrounded by a pump housing 33 centered on the front end of the gear housing 28.

By proper actuation of the connecting elements 10, 23, 24, 25 and 30, three forward speeds and one reverse can be achieved with the planetary gear train 2 shown in FIG. 1. Thus, the forward clutch 10 must be engaged for forward operation in any one of the forward speeds. Actuation of clutch 10 causes the turbine shaft 8 to be directly connected with the ring gear 13 of the first planetary set 11. In the lower gear (first speed), the torque is divided in that it is forwarded to the output shaft 17 in part over the planet carrier 16 of the first planetary set 11 and in part over the ring gear 19 of the second planetary set 12. The torque reaction of the planet gear thereby occurs over the planet carrier 21 of the second planet set 12 which is fixed by the overrunning brake 30 during the acceleration period. The braking effect may be aided, especially during load operation, by the braking action of the multiple-disk brake 25, which facilitates a braking action in both directions of rotation and thus, also provides an engine braking action.

The middle speed (second gear) is controlled both by the engagement of clutch 10 and the immobilization of the sun gear 15, which is common to both planetary sets 11 and 12. The halting of sun gear 15 is achieved by the actuation of band brake 23, thereby preventing rotation of the clutch housing 22 and the sun gear 15. As a result, the torque take-off for shaft 17 occurs solely over the planet carrier 16 of the first planetary set 11, while the planet carrier 21 of the second planetary set 12 runs freely.

In the direct gear (third speed) the band brake 23 is disengaged and clutch 10 and the reverse and direct clutch 24 are engaged. This results in a locking of the entire planetary gear system, causing it to rotate as a block, and the direct connection of the driven output shaft 17 to the turbine shaft 8 with a 1:1 ratio.

In reverse, the forward clutch 10 is released and the direct and reverse clutch 24 is engaged. Furthermore, the multiple-disk brake 25 is actuated by pressure in space 29 and secures the planet carrier 21 of the second planet set 12 against rotation. The torque is therefor transmitted over the clutch housing 22 from the turbine shaft 8 to the sun gear 15. After the direction of rotation is reversed at the planet gears 18, it is transmitted over the ring gear 19 and the strap 20 of the second planetary set 12 to the driven output shaft 17.

Figure 2:
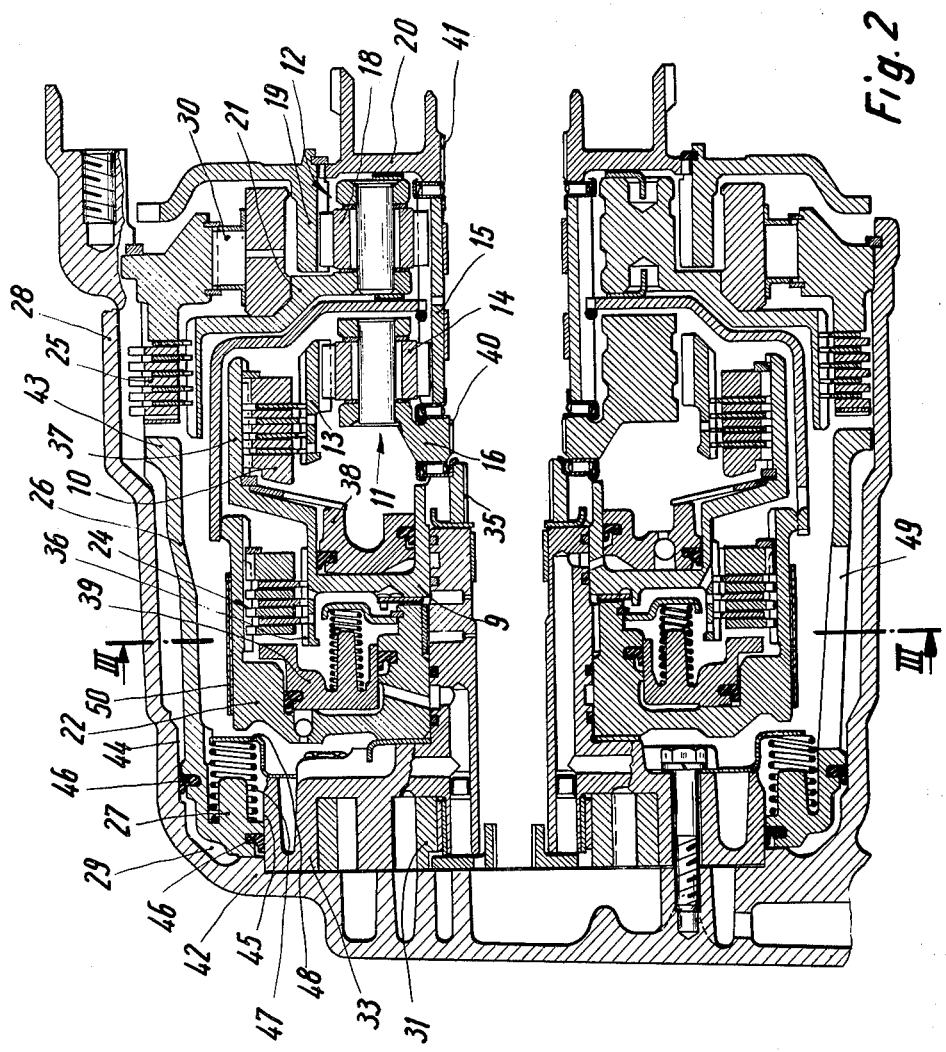
FIG. 2 shows a longitudinal section through the mechanical part of the transmission consisting of a planetary gear system with associated connecting elements.
Figure 3:
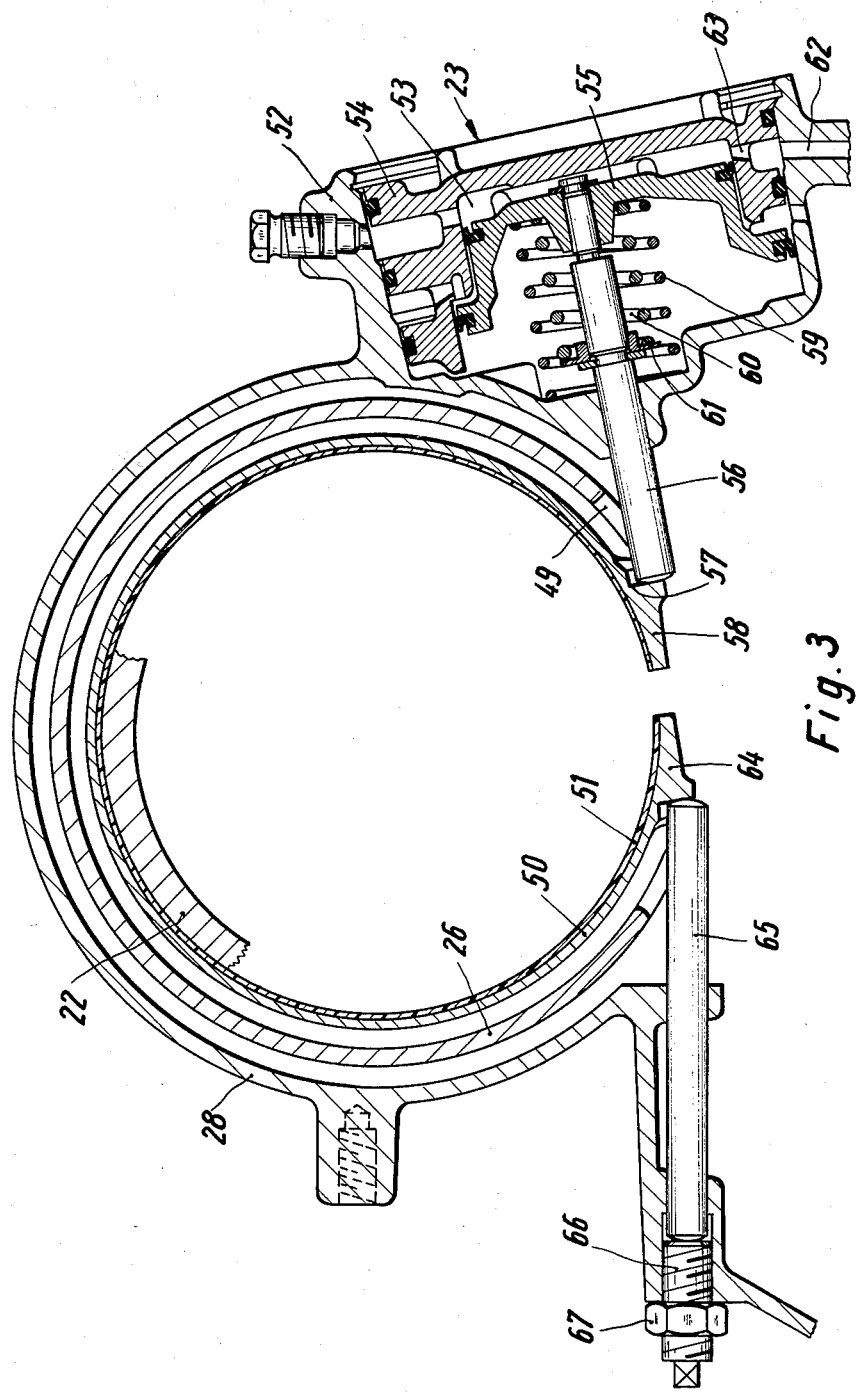
FIG. 3 is a cross section as per the line III—III in FIG. 2.

FIGS. 2 and 3 indicate further details of the hydrodynamic-mechanical transmission shown only in schematic form in FIG. 1. FIG. 2 represents a longitudinal section through the planetary gear system 2. For the sake of simplicity, the concentrically extending shafts, namely, the pump shaft 32, the turbine shaft 8 and the driven output shaft 17, are not shown and the same reference numbers used in FIG. 1 are used to denote the same parts in FIG. 2. FIG. 2 shows the structure of the connecting element 9, which can be connected at its radially inner periphery 35 with the turbine shaft. A first drum-shaped shoulder 36 of element 9, provided with an external gear, carries clutch disks for the direct and reverse clutch 24 and second drum-shaped shoulder 37, provided with an internal gear, carries clutch disks for the forward clutch 10. An actuating piston 38 for the forward clutch 10 is guided in the connecting element 9 while an actuating piston 39 for direct and reverse clutch 24 is guided in the two-part clutch housing 22.

A toothed gear 40 is provided on the radially inner periphery of the planet carrier 16 of the first planetary set 11 and a gear 41 is located on the inner periphery of the strap 20, which is connected with the ring gear 19 of the second planetary set 12. Gears 40 and 41 are connected with the driven shaft 17, not shown.

FIG. 2 clearly indicates the location of the actuating piston 26 for the multiple-disk brake 25. The actuating piston 26 is tubular and extends from the multiple-disk brake 25 to the end 42 of the gear housing 28 farthest away from the torque converter. The piston is concentric with the clutch housing 22 and the brake band 23 (See FIG. 3) and acts with its annular collar 43 against the brake 25. At the opposite end, the actuating piston 26 is provided with a ring-shaped pressure piston 27 which is guided between a recess 44 of the gear housing 28 and the outer diameter 45 of the oil pump housing 33. The pressure piston 27 is provided with lip seals 46 on its radially outer and radially inner sliding surfaces, which seal the servo pressure space 29 enclosed between the piston 27 and the gear housing 28. If servo pressure is applied to this servo pressure space 29 over pressure lines, not shown, the actuating piston 26 is displaced against the pressure of a return spring 47 which is supported on a spring plate 48 fixed on the pump housing 33.

As shown in FIG. 2, and even more clearly in FIG. 3, the actuating piston 26 is provided on its periphery with a window-like opening 49 through which pass the actuating elements of the band brake 23. These elements tighten the brake band 50, which is provided with a friction lining 51. In a lateral elongation 52 of the gear housing 28 (shown in FIG. 3) there is provided an end cap or insert 54, which forms a pressure chamber 53. A pressure piston 55 axially slides within pressure chamber 53 between the stops on an actuating rod 56 connected to the piston 55. Actuating rod 56 extends through the window-like opening 49 of the actuating piston 26 and acts on a clearance 57 at the thickened end 58 of the brake band 50. A return spring 59, for the pressure piston 55 is supported on the gear housing 28 and a firm equalizing spring 60 is supported between a spring plate 61 fastened to the actuating rod 56 and the pressure piston 55. The delivery of the pressure medium to the pressure chamber 53 is obtained through a pipe 62 in the housing section 52 and bores 63 in the insert 54.

The actuating rod 56 supplies force from the pressure piston 55, to one end 58 of the brake band 50 and the opposite end 64 of the brake band 50 is supported in the gear housing 28 by means of a connecting bolt 65. The bolt 65 is held in place by a set screw 66 secured by a check nut 67. The set screw 66 serves to adjust the clearance between the released brake band 50 and the clutch housing 22, which acts as a brake drum.

Due to the novel arrangement of (1) the multiple-disk brake 25 concentrically over the first planetary set 11, the forward clutch 10 and the clutch housing 22 and (2) the actuating piston 26 overlapping the brake band 50 and the clutch housing 22, there is achieved, a very compact construction of the planetary gear system in the axial direction. The short overall axial length is also facilitated by the fact that the overriding brake 30, which is designed as a grip roller freewheel, is placed concentrically over the second planetary set 12. In comparison with the known designs of hydrodynamic-mechanical transmissions, this design as well as the arrangement of the axle drive pinion between the planetary gear system 2 and the torque converter 1 results in such a short overall axial length that an engine-transmission combination can be installed in a vehicle across its longitudinal direction.

While the invention has been particularly shown and described with reference to a preferred embodiment thereof, it will be understood by those skilled in the art that various changes in form and details may be made therein without departing from the spirit and scope of the invention.

What is claimed is:

1. A hydrodynamic-mechanical transmission having a torque converter and a planetary gear system enclosed in a gear housing and controlled by servo pressure from a pump located on an interior end wall of the gear housing, the planetary gear system comprising:
    first and second simple planetary gear sets;
    a clutch housing;
    a forward clutch concentrically above the first planetary set and being concentrically enclosed by the clutch housing, the forward clutch connecting a turbine shaft of the torque converter with a ring gear of the first planetary set upon actuation of the forward clutch;
    a multiple-disc brake acting on a planet carrier of the second planetary set to halt its rotation upon actuation of the brake, the brake being arranged concentrically above the clutch housing, the forward clutch and the first planetary set;
    a grip roller freewheel acting as an overrunning brake on the planet carrier of the second planetary set, the freewheel being arranged concentrically above the second planetary set; and
    a cylindrical piston for actuating the multiple-disc brake concentrically surrounding the clutch housing, said piston being designed to be moved by pressure from an annular cylinder servo pressure space, defined by the pump and the gear housing and arranged concentrically above the oil pump.

2. A hydrodynamic-mechanical transmission having a combination torque converter and planetary gear system enclosed in a gear housing and controlled by servo pressure from a pump on an interior end wall of the gear housing, the planetary gear system comprising:
    first and second simple planetary gear sets, having a common sun gear connecting them;
    a clutch housing attached to the sun gear;
    a forward clutch concentrically above the first planetary set and bein concentrically enclosed by the clutch housing, the forward clutch connecting a turbine shaft of the torque converter with a ring gear of the first planetary set upon actuation of the forward clutch;
    a direct and reverse clutch coupling the turbine shaft with the clutch housing upon actuation of the direct and reverse clutch;
    a band brake acting on the clutch housing to halt its rotation upon actuation of the band brake;
    a multiple-disc brake acting on a planet carrier of the second planetary set to halt its rotation upon actuation of the mutliple-disc brake, the multiple-disc brake being arranged concentrically above the clutch housing, the forward clutch and the first planetary set;
    a grip roller freewheel acting as an overrunning brake between the planet carrier of the second planetary set and the gear housing, said freewheel being arranged concentrically above the second planetary set; and
    a cylindrical piston for actuating the multiple-disc brake surrounding the clutch housing and the band brake, said cylindrical piston being designed to be moved by pressure from an annular cylinder servo pressure space, defined by the pump and the gear housing and arranged concentrically above the oil pump.

3. A transmission as claimed in claim 2 farther including an oil pump housing enclosing the oil pump and being centered on the interior end wall of the gear housing, the cylindrical piston being guided in the servo space formed by the inner diameter of the gear housing and the outer diameter of the oil pump housing, the piston being provided with oil seals so as to create the ring-shaped, oil-tight servo pressure space between the piston, the end wall of the gear housing, the outer diameter of the oil pump housing and the inner diameter of the gear housing, the motion of the piston being controlled by the pressure in the servo pressure space.

4. A transmission as claimed in claim 2 wherein the cylindrical piston has window-like openings in its skirt to allow access to the band brake by means for actuating the band brake.

5. A transmission as claimed in claim 2 farther including:
    an output shaft concentric with the turbine shaft and coupled to a planet carrier of the first planetary gear set,
    a strap connecting a ring gear of the second planetary gear set and the output shaft, and
    an axle drive pinion located on the output shaft between the planetary gear system and the torque converter.

* * * * *